May 21, 1968  L. PETERS  3,383,880
REFRIGERATED BUTTER PATTY DISH
Filed May 11, 1966

INVENTOR:
LEO PETERS
BY
Dawson, Tilton, Fallon, Lungmus & Alexander
ATT'YS

United States Patent Office 3,383,880
Patented May 21, 1968

3,383,880
REFRIGERATED BUTTER PATTY DISH
Leo Peters, 750 Plymouth Road, SE.,
Grand Rapids, Mich. 49506
Filed May 11, 1966, Ser. No. 549,342
2 Claims. (Cl. 62—457)

ABSTRACT OF THE DISCLOSURE

A serving dish for butter-pats, with a refrigerant sealed inside a hollow interior, for the purpose of maintaining butter-pats at cold, but spreadable, temperatures for at least two hours while being used in restaurant dining rooms. The dish has an exceptionally large, flat, shallow top surface for the purpose of providing maximum refrigerating contact for and accessibility to the pats; and an exceptionally high and interrupted footing for easy handling and fast refrigerant regeneration.

---

This invention relates to a refrigerated dish for serving butter or margarine patties in restaurants. For sake of reference, its description will proceed by using the word butter alone. It is concerned with the contradictory functions of (1) serving butter at a controlled temperature while it is surrounded by and subjected to highly uncontrolled temperatures and air currents, and (2) protecting the body of butter by means of temperature without providing any physical means of protection.

It has no concern with the functions of butter storing, or physical protection. On the contrary, it is explicitly designed to accommodate a plurality of butter pats in a non-storable and physically non-protective state.

The dish is required to perform the novel, contradictory, and heretofore unperformed functions of keeping butter pats refrigerated within a cold, but spreadable, ideal temperature range while (1) the butter is completely uncovered, (2) exposed to rapidly changing air movements in a warm room, (3) without direct contact with a refrigerant, (4) from a diminishing supply of refrigeration for a set period of time, and (5) keep such pats in individually accessible condition for a diner's use.

The serving of butter in restaurants presents problems that are peculiar to restaurants, and peculiar to this food alone in restaurants. They are problems which center around the inter-relationship of butter temperature, hardness, spreadability, and taste. To be pleasant to the taste, butter must be cold. To be pleasant to use it must be spreadable. But if it is too cold, it is too hard to be spreadable. And if it is too warm, even though highly spreadable, it is too soft for good appearance or good taste.

Standard present-day practice for serving butter in restaurants is to place butter pats in a small bowl along with ice cubes. With ice at 32° and in direct contact with the butter, the latter is rendered too cold and hard for spreading. At this temperature it can only be lumped (not spread) on such foods as bread and crackers; in the process of which bread and crackers are split and broken. Furthermore, contact with ice mutilates the shape of butter pats, bleaches their surfaces, and speckles them with water. On the other hand, if butter is served at normal room temperatures without ice, it is too warm and too soft for good taste and appearance. Either way it is served today, butter becomes lumped together, difficult to use, messy in appearance, and produces considerable waste. Either way, restaurants are confronted with problems and conditions for serving butter which are very undesirable.

The ideal temperature range for producing both pleasantly cool taste and easy spreadability in butter is in the 40° to 60° temperature range. Outside this range: on the low side butter is too hard, and on the high side it is too soft, for pleasant use.

Many methods and structures have been devised to overcome the problems and produce the ideal conditions for serving butter in restaurants. But, to date, none of them have done this, and so have not fulfilled the essential needs of the market. As a result none of them have had any noticeable commercial acceptance, and none of them envisioned the particular structure, methods or means of this invention. None of them have been constructed and arranged to fulfill the detailed and peculiar requirements called for by and perform the particular functions of this invention, including the elimination of dependence on the human element to service the refrigerant requirements of the refrigerating method.

It is, therefore, the general objective of this invention to solve the interrelated problems mentioned above, and to eliminate the practical deficiencies of prior art in this field.

It is the specific object of this invention to provide a unitary, sealed-reservoir, serving dish for butter pats having a flat, shallow open-top section for holding pats in a physically non-protective and easily-accessible condition. This top section also forms the upper part of a hollow reservoir section within which is sealed a refrigerant material which can be chilled below the freezing point of the liquid (water) content of butter, and which will maintain butter pats within the 40° to 60° ideal serving temperature range for at least one hour while they are unprotected and exposed to ambient air at the normal 70° or higher room temperatures.

The invention is described in conjunction with the accompanying drawing, in which.

Figure 1:
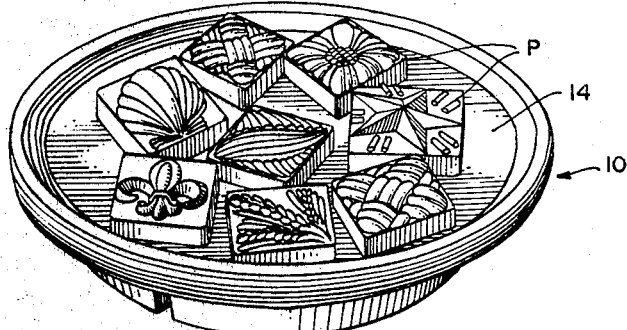
FIG. 1 is a perspective view of the dish shown supporting a plurality of embossed butter pats.
Figure 2:
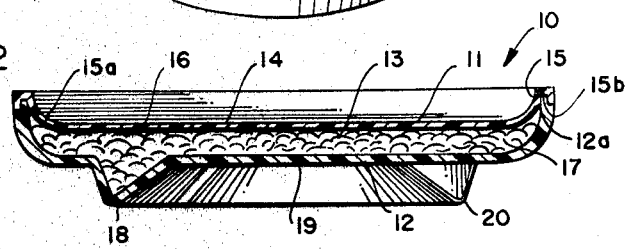
FIG. 2 is a diametral sectional view of the dish of FIG. 1.
Figure 3:
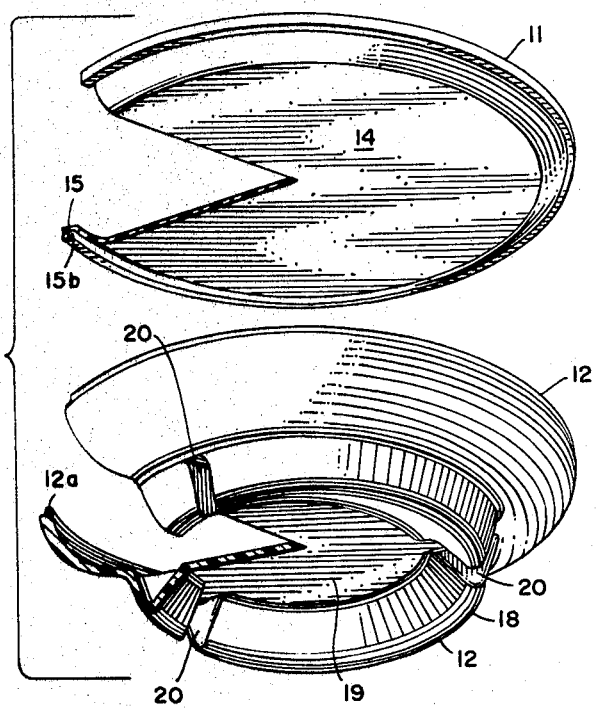
FIG. 3 is an exploded perspective view, partly broken away as seen from the dish bottom.

The dish 10 includes a top section 11, a bottom section 12 which are peripherally sealed to provide a refrigerant reservoir 13. These items are described below under suitable subheadings.

A top section 11 for holding butter pats

For butter pats P to be quickly and easily accessible to a diner, the top section or wall 11 of my butter dish 10 has (a) at least 60% of its projected surface flat as at 14 so that a maximum number of pats can lay flat thereon, (b) a narrow surrounding ridge or rim 15 (occupying no more than 40% of the top section's total area) within which to confine pats, (c) a shallow depth, (d) complete exposure, without any kind of cover or overhead physical protection so that the butter pats P lying thereon are quickly and easily accessible for a diner to slip a knife underneath them or knife into them.

My dish is preferably 5½" in overall diameter with a 4¾" diameter in the flat area. This amount of flat area is very unusual in a dish of this small size, but it is advantageous here to provide sufficient area for at least 8 large pats to lie flat without being squeezed together or lying on top of each other. Eight pats provide an adequate service for a table of four people, while at the same time my 5½" diameter occupies no more space on the table than a single roll-butter dish for one person.

The flat area 14 serves another important function: it provides a relatively large space on which the flat bottom side of butter pats can lie flat in a flat-surface contact with the dish. With this kind of contact, the prime refrigerating function of my dish is advantageously operative in a variety of environments.

The flat surface area 14 preferably has a slight raised (about .005″ depth) pattern or tread 16 across its surface to provide an anti-skid surface for and a friction contact between the butter and the dish's top surface to assist in preventing the pats from sliding when the dish is moved and when a diner wishes to slip a knife underneath a pat.

The function of the surrounding rim 15 is to prevent the pats from sliding off while the dish is being moved or a diner is in the act of slipping a knife underneath a pat. What is unusual about the rim of my dish 10 is its height and relative steepness. It is of a relatively insignificant height; i.e., the depth of the top section is relatively shallow. This depth is in the same range as the thickness of most commercially-sold butter pats, namely from ¼″ to ½″. Thus there is no significant barrier to the accessibility of a butter pat; the barrier being no greater than the thickness of the thickest commercially-used butter pat. Thus butter pats are maintained on the top of my dish in a virtually complete unprotected state, accessible to a diner's knife with a maximum of ease, or a minimum of bother.

The steepness of the surrounding rim 15 functions as a good abutment against which to stop a pat when it is being pushed by a diner's knife. The rim, preferably, has an annular inside radius 15a of not more than about ½″ which gives an inside steepness of no less than a 45° angle. Experience indicates that this angle provides adequate abutment against a pat being pushed off the dish.

*A middle reservoir 13*

This is a hollow sealed chamber-like section formed by bonding together the top section 11 and a cavity-shaped bottom section 12, to serve as a reservoir 13 within which is sealed a refrigerating material 17.

This hollow reservoir section is designed to provide a cubic space for a refrigerator chilling material of sufficient amount to fill the reservoir so that (1) contact will be maintained at all times between the material and the underside of the top section during the expansions and contractions brought about by alternate freezing and thawing temperatures to which the dish is subjected, and (2) maintain the butter pats within the ideal temperature range for at least 1 hour.

The reservoir section may have a refrigerant material 17 sealed within it in a manner that prevents leakage. If the refrigerant material 17 is a liquid I would seal the reservoir in a liquid-tight condition. If it is a non-flowable mass I would need to seal the reservoir only sufficiently to prevent escape of such a non-flowable material under the pressures generated within the reservoir by alternate and repeated freezing and thawing, boiling and cooling heats, during the dish's normal daily use cycle.

With sealing to prevent leakage assuring a constant quantity of refrigerant material within the reservoir, a predictable refrigerating function and result may be expected. By sealing the refrigerant material within the dish I eliminate dependence on the uncertain human element to service this highly important function of my dish.

By refrigerant material I mean preferably a material that is characterized by a freezing point and heat capacity relationship capable of extracting heat from the under surfaces of the pats in a manner that will maintain our butter pats within the ideal temperature range of 40° to 60° in a 70° F. or higher room. My refrigerant material advantageously should have a freezing point at about 32°, which is substantially below the temperature at which I wish to maintain the butter. For example, in the heat exchange between a 32° temperature inside my dish and a 70°+ temperature in the outside room, between 10° and 20° of the temperature differential is lost via conduction through the top section separating the refrigerant material and the butter, and in offsetting the exposure to the constantly changing 70°+ temperatures and air currents sweeping across the exposed butter during the busy meal-serving times in a restaurant.

Thus the resulting temperature of butter exposed on a 32° interior-temperatured dish is in the 42° to 52° range. By starting with a temperature in the refrigerant material slightly lower or higher than 32°, I can control the temperature of the butter so that it will be well within the ideal temperature range desired for the butter, and do this even in 80° to 90° room temperatures. It must be understood that because of considerable variations in the temperature and air movements during meal-serving times, there will be variations within the ideal temperature range desired for the butter and that such variations are not produced by variations in the temperature of the low-temperatured refrigerant material within the dish.

The cubic size of the hollow interior is determined by the amount of a given mass of refrigerant material needed to maintain butter at the ideal temperatures for the time required to serve and eat a leisurely dinner. For example, a leisurely dinner is normally finished in about an hour. For such a time period, I have found that a surprisingly small amount (3 ounces of an 85% water, 15% solids gel, e.g., a glycollate) will maintain butter pats at the ideal temperatures in a 70° restaurant room for well over the required hour. The size of the hollow interior, and the amount and/or composition of the refrigerant material within it may, of course, be tailored before sealing it within the reservoir so that it will perform according to my requirements under whatever conditions are present in a dining room.

A number of chilling materials may be used for the refrigerating requirements of my dish. Water alone, brine or alcohol solutions of varying strengths, anti-freeze chemicals such as ethylene glycols and glucose-sodium-glycollates of varying strengths, are all acceptable refrigerant materials for use with my invention.

*A bottom section 12 for forming and supporting the other sections*

The bottom section 12 of the dish 10 supports the top section 11 and is the top section's complementary member with which the hollow reservoir section 13 is formed. The bottom section is preferably structured to obtain two important functional advantages:

(a) As a relative non-conductor of heats.

It is preferably made somewhat thicker or denser than the top section 11 so that relative to the top section it functions as an insulator rather than a conductor of heats. This has the advantageous effect of directing and forcing the passage of low temperature heats out of the frozen refrigerant material in the hollow section of the dish through the top (thinner or less dense) section.

Since the butter pats lay within and against the better heat-conducting top section 11, this provides the maximum and most efficient use of the butter-refrigerating function of my dish at the point where the refrigeration is desired. Further, by reducing the amount of fast-heat-conducting surfaces to just the surface on which the butter is placed, the length of refrigerating time relative to the mass of refrigerant material is lengthened.

(b) As a footing to serve 3 advantageous functions

A circular portion 18 of the bottom 12 is spaced considerably outward (downward about ½″) from the plane area 19 of the bottom and spaced sufficiently inward about ¾″ from the outside of the dish inscribed within the above-mentioned annular radius of curvature 15a to provide a footing which yields the following advantages:

(1) Unusual elevation of and a spaced relation from the main portion of the dish to provide adequate space into which a diner or waiter can easily slip fingers underneath the dish, and with thumb and fingers grasp and lift the dish with greater ease than with normal dishes. A butter dish is probably the most frequently moved dish on a restaurant table as one diner after another requests of his fellow-diner, "Please pass the butter." Therefore it is highly desirable that provision be made to make this an easy maneuver.

(2) Also, by having such an elevated footing, plus having it with interrupted continuity, as at 20, another important advantage is obtained; an advantage that is peculiarly desirable for my dish's particular structure and function.

In using my dish it is necessary that during part of a day's time it be stacked in a freezer for reducing the temperature of the refrigerant material. It is in this freezer-stacking operation that my footing 18 serves a purpose that is peculiarly advantageous in my dish. When stacked on top of each other the footing 18 provides an unusually wide spacing between the reservoir sections of adjacent stacked dishes. This spacing, plus the open (interrupted continuity) spaces within the footing itself, permits an unusually free and complete circulation of air under and between the dishes. This in turn provides maximum speed and efficiency for freezing the refrigerant contents.

This speed is important in order that the 4 to 5 hour between-meal chilling of the refrigerant material 17 be fully accomplished between restaurant meal-times. In addition, by having the spacing between stacked dishes performed by a structural element within the dish itself, I eliminate the nuisance, cost, and time which would be required if the spacing apart of the dishes was done by a separate piece inserted between the dishes while they were stacked in a freezer.

(3) The footing in my dish also serves to increase the cubic space within the reservoir section, so that greater amounts of chilling material 17 may be provided with a corresponding extension of the time during which such material can yield its refrigerating temperatures, and do this without increasing the main area thickness or outside diameter of the dish. Also, for both table appearance and occupancy of table space, it is advantageous to a restaurant owner to keep the size of the dish as small as possible.

*The expansion-contraction section*

Several times during a normal use-day in a restaurant, my dish may be subjected to extremes of temperature ranging from about 212° F. down to about 0° F. At both extremes, it is subjected to considerable internal expansion of its refrigerant contents 17, and in between the extremes, it undergoes the same amount of contraction. The dish is subjected to freezing temperatures to prepare it for its on-the-table refrigerating function, and is subjected to boiling temperatures as it passes through a dishwasher. If this refrigerant material is water, it will expand about 10% as the water freezes, and then contract correspondingly as the water thaws. After use on the table, it goes to a restaurant dishwasher where temperatures range from 175° up to the 212° boiling point. At the boiling point, and if water is the refrigerant material, a small amount of steam may be generated which could cause somewhat more than a 10% internal expansion. After that, on cooling, a corresponding amount of internal contraction takes place.

Thus, throughout a normal restaurant day, my dish may be subjected to at least 3 meal-time uses and 3 internal expansions and contractions. Because of this, it is necessary that one section of the dish be flexible enough to accept at least 10% internal expansions and contractions, at least 3 times a day, over many years of use, and do this without permanently distorting the shape of the dish.

Because of these conditions, a completely metal dish, or one made of a completely inflexible material, would not be suitable for my structure. Such inflexible materials, or a material which will flex but not recover or contract, would either wreck the dish or produce permanent distortions, and render the dish unsightly and unusable.

A flexible section that will expand and contract without permanent distortion, i.e., without exceeding the elastic limit, is therefore a necessary requirement of the dish. Such a section could be inserted in most any area of the dish. It could be a small diaphragm, or a whole section. I prefer to go beyond just one section that is flexible. I prefer to make the entire dish of a material that on the one hand is sufficiently stiff and rigid to maintain a true shape, yet is flexible enough to expand and contract without becoming permanently distorted. With such a preferred embodiment expansions and contractions can, to some extent, depending on the particular shape of the dish, be absorbed throughout the entire dish structure, or they can be concentrated at some particular point which happens to be the particular direction in which the refrigerant material seeks its expansions and contractions.

I have found that several commercially available materials, singly and/or in combination, are suitable for the construction of my dish. Certain stainless steels and aluminums may be used for either the top or bottom sections provided the opposite section is made of an expandable-contractable material. However, in my preferred embodiment of this invention, I make both top and bottom sections from certain of the more advanced formulations of such plastic materials as polypropylene and polyethylene. By using such materials, I can achieve throughout the entire dish both flexibility and rigidity, and a balance between these two contradictory qualities. I achieve flexibility in both top and bottom sections of a degree that will insure against breakage and permanent distortion during the violent expansions and contractions of the refrigerant material, while at the same time providing a relatively rigid flat surface on which to hold and from which to knife butter pats. Both of these contradictory qualities are necessary in the structure of my dish.

The integration of the upper and lower walls is advantageously achieved by fusing portions of the rim underside as at 15*b* with the top perimeter of the cup-shaped bottom as at 12*a*.

*The dish as a unit*

While constructed of more than one section and component, the preferred embodiment of my dish is flat-topped and high-footed, welded together so that it is a single, integral, expandable and contractable but not permanently distortable unit with a refrigerant material sealed within it. As such, the inventive dish can be advantageously employed with other chilled foods, viz, margarine, ice cream, etc.

It is necessary that the dish be a single sealed unit in order to provide maximum ease and efficiency in use, and eliminate dependence on the human element for servicing and maintenance of its refrigerant.

To achieve this unitary structure, the dish is preferably arranged with and made from materials which will permit its refrigerant contents to be subjected to the violent expansions and contractions produced by such extreme time and temperature conditions as rapid freezing in 0° temperatures shortly thereafter washing in 212° dishwasher temperatures without leakage of the refrigerant material, and without breaking or permanently distorting the original structure and shape; and do this in a manner which will give the dish a long life of several-times-a-day cycles.

The structure and component arrangement of my dish takes cognizance for the first time of all the various factors required to give restaurant operators a completely satisfactory butter serving dish. If the stated performance of this dish in the serving of completely exposed butter pats under the constantly changing and extreme conditions of use is unique, it is because of an unusual combination of materials and a surprisingly novel arrangement of a structure.

The several dimensional specifications outlined herein cover a preferred embodiment of my invention as it applies to the accommodations of at least 8 normal 1¼" x 1¼" commercial butter pats. It will be understood that these preferred dimensions may be varied, depending on the shape (round, square, etc.) of dish that may be desired and the number of pats the dish is required to accommodate, and still be within the scope and spirit that is served by the preferred dimensions.

I claim:

1. A refrigerated dish for butter patties comprising a unitary body having spaced apart top and bottom walls integrated about their peripheries to provide a refrigerant chamber therein, a refrigerant medium in said chamber in an amount sufficient to maintain eight commercial-sized butter patties in the temperature range 40°–60° for at least one hour in 70° ambient temperature, said top wall being centrally flat with the centrally flat portion constituting at least about 60% of the total top wall surface, the remander of said top wall including an integral upstanding rim merging into said flat portion by a relatively sharp annular radius of curvature, said rim projecting not substantially more than ½" above said flat central portion, the area of said top surface being not substantially more than that developed by a maximum dimension of about 6", the walls of said dish being made at least in part of a material sufficiently rigid to maintain the normal shape and dimensions of the dish intact yet sufficiently flexible to permit the dish to expand without breaking or being permanently distorted as the refrigerant medium expands while being alternately subject to freezing and boiling temperatures, and having recovery abilities that return the dish to its normal shape and dimensions as the refrigerant material contracts under alternately thawing and cooling.

2. The dish of claim 1 in which said bottom wall is equipped with an integral depending footing circumscribed within said annular radius of curvature, said footing being hollowed to constitute a continuation of said chamber and interrupted radially at spaced circumferential points to provide avenues for the ingress of air under the central portion of said lower wall.

References Cited

UNITED STATES PATENTS

| | | | |
|---|---|---|---|
| 1,858,247 | 5/1932 | Milliron et al. | 62—457 |
| 2,501,772 | 3/1950 | Guard | 62—457 |
| 2,542,173 | 2/1951 | Wolf | 62—438 X |
| 2,810,276 | 10/1957 | Murray | 62—457 |
| 3,240,030 | 3/1966 | Peters et al. | 62—457 |

LLOYD L. KING, *Primary Examiner.*